United States Patent Office 3,256,505
Patented June 14, 1966

3,256,505
1-XANTHENYL-4-PHENYLPIPERIDINE-4-
CARBOXYLIC ACID ESTERS
John W. Cusic, Skokie, and Peter Yonan, Chicago, Ill.,
assignors to G. D. Searle & Co., Chicago, Ill., a corporation of Delaware
No Drawing. Filed May 18, 1964, Ser. No. 368,366
6 Claims. (Cl. 260—293.4)

The present invention relates to a group of compounds which are esters of 1-substituted 4-phenylpiperidine-4-carboxylic acids. The substituent at the 1-position of the piperidine is xanthenyl, thioxanthenyl, substituted xanthenyl, or substituted thioxanthenyl. In particular, the present invention relates to a group of compounds having the following general formula

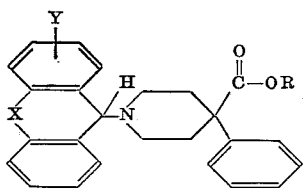

wherein X is selected from the group consisting of O and S; Y is selected from the group consisting of hydrogen, halogen, and methyl; and R is a lower alkyl radical. The halogens referred to above include fluoride, chlorine, bromine, and iodine. The lower alkyl radicals referred to above contain up to 6 carbon atoms and are exemplified by radicals such as methyl, ethyl, propyl, isopropyl, and butyl.

The compounds of the present invention are conveniently prepared by the reaction of xanthydrol or thioxanthydrol with an ester of 4-phenylpiperidine-4-carboxylic acid. The reaction is carried out at reflux in an inert solvent in the presence of a weak acid. Toluene is a particularly useful solvent for the reaction although benzene and xylene are examples of other solvents which can be used for this purpose. A weak acid such as acetic acid can be used to catalyze the reaction. The reaction is usually carried out in an apparatus equipped with a water trap so that water is removed from the reaction mixture as it is formed.

The compounds of the present invention are useful because of their pharmacological properties. Thus, the present compounds have been found to possess anti-hypertensive activity. In addition, they possess activity as anti-atherogenic agents. This is demonstrated by their ability to inhibit hepatic synthesis of cholesterol.

The organic bases of this invention form pharmaceutically acceptable, non-toxic, acid addition salts with a variety of organic and inorganic acids. Such salts are formed with acids such as sulfuric, phosphoric, hydrochloric, hydrobromic, hydriodic, sulfamic, citric, lactic, maleic, succinic, tartaric, cinnamic, acetic, benzoic, gluconic, ascorbic, and related acids.

The following examples are presented to further illustrate the present invention; they should not be construed as limiting it in spirit or in scope. In these examples, quantities are indicated in parts by weight and temperatures in degrees centigrade (° C.).

Example 1

A mixture of 15 parts of xanthydrol, 17 parts of ethyl 4-phenylpiperidine-4-carboxylate and 8 parts of glacial acetic acid in 220 parts of toluene is heated at reflux for 16 hours in an apparatus equipped with a water trap. The resultant mixture is treated with charcoal and filtered while hot. The solvent is evaporated from the filtrate under reduced pressure to leave a residual solid which is mixed with ether and filtered. The solid is then recrystallized from a mixture of chloroform and ether to give ethyl 1-(9-xanthenyl)-4-phenylpiperidine-4-carboxylate melting at about 186–187° C. This compound has the following formula

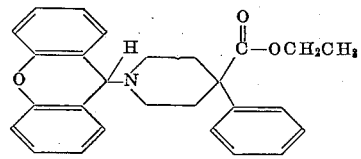

Example 2

An equivalent quantity of methyl 4-phenylpiperidine-4-carboxylate is substituted for the ethyl 4-phenylpiperidine-4-carboxylate and the procedure of Example 1 is repeated to give methyl 1-(9-xanthenyl)-4-phenylpiperidine-4-carboxylate.

Example 3

A mixture of 12 parts of 2-chloroxanthydrol, 10 parts of ethyl 4-phenylpiperidine-4-carboxylate and 6 parts of glacial acetic acid in 220 parts of toluene is refluxed for 17 hours in an apparatus equipped with a water trap. The resultant mixture is treated with charcoal and filtered while hot and the solvent is evaporated from the filtrate at reduced pressure to leave a residual solid. This solid is recrystallized from a mixture of chloroform and ether to give ethyl 1-(2-chloro-9-xanthenyl)-4-phenylpiperidine-4-carboxylate melting at about 199–200° C. This compound has the following formula

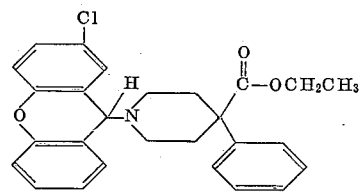

Example 4

An equivalent quantity of 4-methylxanthydrol is substituted for 2-chloroxanthydrol and the procedure described in Example 3 is repeated. The product thus obtained is ethyl 1-(4-methyl-9-xanthenyl)-4-phenylpiperidine-4-carboxylate.

Example 5

A mixture of 12 parts of thioxanthydrol, 10 parts of ethyl 4-phenylpiperidine-4-carboxylate and 6 parts of glacial acetic acid in 220 parts of toluene is refluxed for 19 hours in an apparatus equipped with a water separator. The resultant reaction mixture is treated with charcoal and filtered while still hot. The solvent is evaporated from the filtrate under reduced pressure to leave a residual solid. This solid is dissolved in chloroform and hexane is added. The resultant mixture is cooled to give crystals which are then separated and recrystallized from a mixture of chloroform and pentane to give ethyl 1-(9-thioxanthenyl)-4-phenylpiperidine-4-carboxylate melting at about 146–148° C.

Example 6

An equivalent quantity of methyl 4-phenylpiperidine-4-carboxylate is substituted for the 10 parts of ethyl 4-phenylpiperidine-4-carboxylate and the procedure described in Example 5 is repeated. The product obtained in this way is methyl 1-(9-thioxanthenyl)-4-phenylpiperidine-4-carboxylate. This compound has the following formula

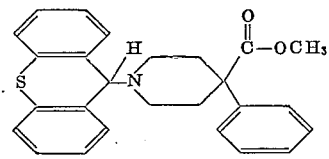

What is claimed is:
1. A compound of the formula

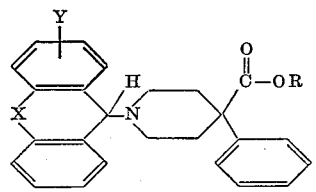

wherein X is selected from the group consisting of O and S; Y is selected from the group consisting of hydrogen, chlorine, and methyl; and R is lower alkyl.

2. A compound of the formula

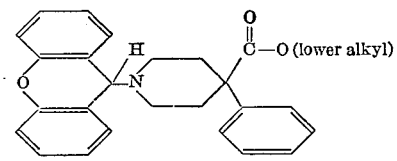

3. Ethyl 1-(9-xanthenyl)-4-phenylpiperidine-4-carboxylate.
4. Ethyl 1-(2-chloro-9-xanthenyl)-4-phenylpiperidine-4-carboxylate.
5. A compound of the formula

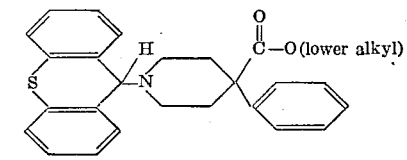

6. Ethyl 1-(9-thioxanthenyl)-4-phenylpiperidine-4-carboxylate.

No references cited.

WALTER A. MODANCE, *Primary Examiner.*
AVROM DAVID SPEVACK, *Examiner.*